United States Patent
Kitano

(10) Patent No.: US 8,734,684 B2
(45) Date of Patent: May 27, 2014

(54) METHOD FOR PRODUCING METALLIC CARBON NANOTUBE, CARBON NANOTUBE DISPERSION LIQUID, CARBON NANOTUBE-CONTAINING FILM, AND TRANSPARENT CONDUCTIVE FILM

(75) Inventor: Takahiro Kitano, Ishikawa (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 328 days.

(21) Appl. No.: 13/125,875

(22) PCT Filed: Oct. 22, 2009

(86) PCT No.: PCT/JP2009/068169
§ 371 (c)(1),
(2), (4) Date: Apr. 25, 2011

(87) PCT Pub. No.: WO2010/047365
PCT Pub. Date: Apr. 29, 2010

(65) Prior Publication Data
US 2011/0204300 A1 Aug. 25, 2011

(30) Foreign Application Priority Data
Oct. 24, 2008 (JP) ................. 2008-274688

(51) Int. Cl.
*C01B 31/02* (2006.01)

(52) U.S. Cl.
USPC .... 252/502; 423/461; 423/445 R; 423/445 B; 209/8; 209/10; 977/734; 977/737; 977/742; 977/843; 977/847

(58) Field of Classification Search
USPC .......... 252/500–511; 423/445 R, 445 B, 461; 209/8, 10; 977/734, 737, 742, 843, 847
See application file for complete search history.

(56) References Cited

U.S. PATENT DOCUMENTS

| | | | |
|---|---|---|---|
| 2004/0038251 A1 | 2/2004 | Smalley et al. | |
| 2004/0040834 A1 | 3/2004 | Smalley et al. | |
| 2005/0067349 A1* | 3/2005 | Crespi et al. | 210/634 |
| 2006/0231399 A1 | 10/2006 | Smalley et al. | |
| 2007/0148962 A1 | 6/2007 | Kauppinen et al. | |
| 2008/0260616 A1* | 10/2008 | Tour et al. | 423/447.1 |
| 2009/0252946 A1* | 10/2009 | Marsh et al. | 428/304.4 |
| 2010/0044230 A1* | 2/2010 | Papadimitrakopoulos et al. | 204/547 |
| 2011/0053050 A1* | 3/2011 | Lim et al. | 429/524 |

FOREIGN PATENT DOCUMENTS

| | | |
|---|---|---|
| CN | 1483012 | 3/2004 |
| CN | 1922106 | 2/2007 |
| JP | 2005 527455 | 9/2005 |
| JP | 2007 527844 | 10/2007 |
| JP | 2008 055375 | 3/2008 |
| JP | 2008 230947 | 10/2008 |
| TW | 200711994 | 4/2007 |
| TW | 200819388 | 5/2008 |
| WO | 2006 013788 | 2/2006 |
| WO | 2008/002317 | 1/2008 |

OTHER PUBLICATIONS

Maeda, Y., et al., "Large-Scale Separation of Metallic and Semiconducting Single-Walled Carbon Nanotubes," Journal of American Chemical Society, vol. 127, pp. 10287-10290, (Jul. 1, 2005).
Tomonari, Y., et al., "Separation of metallic SWNTs and semiconducting SWNTs," Polymer Preprints, Japan, vol. 54, No. 1, p. 901, (2005) (with English Abstract).
Islam, M.F., et al., "High Weight Fraction Surfactant Solubilization of Single-Wall Carbon Nanotubes in Water," NANO Letters, vol. 3, No. 2, pp. 269-273, (Jan. 16, 2003).
Hertel, T., et al., "Spectroscopy of Single- and Double-Wall Carbon Nanotubes in Different Environments," NANO Letters, vol. 5, No. 3, pp. 511-514, (Feb. 18, 2005).
O'Connell, M.J., et al., "Reversible water-solubilization of single-walled carbon nanotubes by polymer wrapping," Chemical Physics Letters, vol. 342, pp. 265-271, (Jul. 13, 2001).
International Search Report issued Dec. 22, 2009 in PCT/JP09/068169 filed Oct. 22, 2009.
Search Report listed in corresponding Taiwan Application No. 098135925 issued Dec. 25, 2013—2 pgs.

* cited by examiner

*Primary Examiner* — Tri V Nguyen
(74) *Attorney, Agent, or Firm* — Oblon, Spivak, McClelland, Maier & Neustadt, L.L.P.

(57) ABSTRACT

A method for producing a metallic carbon nanotube, by which a dispersion with a high concentration can be obtained. Specifically disclosed is a method for producing a metallic carbon nanotube, which comprises a fullerene addition step wherein fullerenes are added into a carbon nanotube-containing solution in which metallic carbon nanotubes and semiconductive carbon nanotubes are mixed, and a taking-out step wherein carbon nanotubes dispersed by the added fullerenes are taken out.

14 Claims, No Drawings

METHOD FOR PRODUCING METALLIC CARBON NANOTUBE, CARBON NANOTUBE DISPERSION LIQUID, CARBON NANOTUBE-CONTAINING FILM, AND TRANSPARENT CONDUCTIVE FILM

TECHNICAL FIELD

The present invention relates, particularly, to a metallic carbon nanotube.

BACKGROUND ART

Recently, an enlargement of a market of flat-screen devices typified by a liquid display augments a demand for the transparent conductive film. The transparent conductive film is employed, for example, for an electrode. Or, it is employed for a resistive touch panel. Or, it is employed for an electromagnetic wave shielding film. It is employed for various fields besides them. The transparent conductive film of this type, as a rule, is configured of metal oxide such as Indium thin oxide (ITO). And, the transparent conductive film such as ITO is manufactured with the methods such as sputtering. Thus, the film-forming with these methods necessitates a high temperature. For this, the use of a resin substrate having a poor heat-resistance is greatly restricted. In addition, the film-forming requires a vacuum environment. For this, a gigantic film-forming device is necessitated as the substrate become big. Thus, the film-forming becomes costly. Further, In is hard to obtain because it is a rare metal. Thus, ITO becomes costly from this viewpoint as well.

The alternative technology, which replaces ITO, has been proposed from such a background. In particular, the technology has been proposed of forming the carbon nanotube film with the coating method. Additionally, the transparent conductive film using the carbon nanotube is highly evaluated.

By the way, it is said that the single-walled carbon nanotube, out of the carbon nanotubes, is highest in conductivity. As it is, it is hard to disperse the single-walled carbon nanotube into a solvent. Thus, it is not easy to constitute the single-walled carbon nanotube conductive film with the coating technique. Thereupon, the technique employing a dispersing agent has been proposed. For example, it is proposed to employ sodium dodecyl sulfate (Non-patent literature 1). Further, it has been proposed to employ sodium dodecylbenzene sulfonate (Non-patent literature 1). Further, it has been proposed to employ octylphenol polyethylene glycol ether (Non-patent literature 1). Further, it has been proposed to employ sodium cholate (Non-patent literature 2). Further, it has been proposed to employ polyvinylpyrrolidone (Non-patent literature 3).

CITATION LIST

Non-Patent Literature

NPL 1: M. F. Islam et al. "NANO LETTERS 2003, Vol. 3, 269"
NPL 2: T. Hertel et al. "NANO LETTERS 2005, Vol. 2, 511"
NPL 3: Michael J. O'Connell et al. "Chemical Physics Letters 342 (2001) 265"

Patent Literature

PTL 1: WO-P2006-013788A1
PTL 2: JP-P2008-055375A

SUMMARY OF INVENTION

Technical Problem

However, only the single-walled carbon nanotube dispersion liquid of which a concentration is low can be obtained even though a large quantity of sodium dodecylbenzene sulfonate (dispersing agent) is employed. For example, in the Non-patent literature 1, even though 20 mass % of sodium dodecylbenzene sulfonate over a solvent is used, only the single-walled carbon nanotube dispersion liquid of which a concentration is low can be obtained.

With the case of using polyvinylpyrrolidone (dispersing agent) (Non-patent literature 3), the single-walled carbon nanotube dispersion liquid of which a concentration is high can be obtained. The dispersing agent (polyvinylpyrrolidone), however, cannot be removed. For this, even though a film of the single-walled carbon nanotube is formed, this single-walled carbon nanotube film is low in the conductivity. Thus, for this reason, it is hard to utilize this film as a transparent conductive film.

In such a manner, the prior art is capable of obtaining only the single-walled carbon nanotube dispersion liquid of which a concentration is low even though a large quantity of the dispersing agent is employed. That is the reason why the practical coating method such as a bar coating cannot be employed therefor.

The single-walled carbon nanotube dispersion liquid employing organic solvents such as tetrahydrofuran and dimethylformamide has been proposed. However, tetrahydrofuran is very toxic. Further, the boiling point of dimethylformamide is too high. Thus, the use of these solvents is not preferable. That is, it is difficult to put them to practical use.

From such a background, it is desirable that the single-walled carbon nanotube dispersion liquid dispersed into the solvents such as water and alcohol (for example, alcohol such as methanol and 2-propanol) comes out.

However, so far, employing water (only water) as a solvent has caused a problem that wettability is bad and dispersibility is bad.

By the way, it is pointed out that a metallic carbon nanotube and a semiconducting carbon nanotube exist as the carbon nanotube. Herein, the so-called metallic carbon nanotube is a single-walled carbon nanotube having no band-gap in an axis direction. Specifically, when a chiral vector (Ch) of the single-walled carbon nanotube is expressed by the following equation [Ch=(n,m), where each of n and m is an integer], the carbon nanotube characterized by the chiral vector, where n-m is a multiple of three, can be listed as the metallic carbon nanotube. The so-called semiconducting carbon nanotube is a single-walled carbon nanotube having band-gaps in the axis direction. Specifically, when the chiral vector (Ch) of the single-walled carbon nanotube is expressed by the following equation [Ch=(n,m), where each of n and m is an integer], the carbon nanotube characterized by the chiral vector, where n-m is not a multiple of three, can be listed as the semiconducting carbon nanotube. And, it is supposed that the semiconducting carbon nanotube is poor in the conductivity as compared with the metallic carbon nanotube. Thus, it would be preferable to employ the metallic carbon nanotube in a priority manner at the moment of employing the carbon nanotube for the transparent conductive film. That is, in a case of employing the carbon nanotube as a component of the conductive film, it would be preferable to make a ratio of the metallic carbon nanotube relatively high also when both of the semiconducting carbon nanotube and the metallic carbon nanotube are contained.

However, the method (separating method) of taking out the metallic carbon nanotube in a priority manner from the carbon nanotube in which the semiconducting carbon nanotube exists together with the metallic carbon nanotube has not been proposed so much. For example, the method of utilizing a difference of the adhesion force by octylamine has been proposed (Patent Literature 1). Further, the method of utilizing an electrophoresis has been proposed (Patent Literature 2). These methods, however, have a problematic point that a content quantity of the carbon nanotube in the dispersion liquid to be obtained is low. Further, there is a problematic point that these methods can be applied only for the short carbon nanotube.

Thus, a task that the present invention is to solve, that is, an object of the present invention is to solve the above-mentioned problematic points.

In particular, an object of the present invention is to provide a method of producing the metallic carbon nanotube that is capable of obtaining a dispersion with a high concentration.

Further, an object of the present invention is to provide a technology capable of forming the transparent conductive film having high conductivity/transparency, which employs the metallic carbon nanotube, with a simple coating technology.

Solution to Problem

This inventor earnestly has pushed an investigation for solving the foregoing problems. As a result, this inventor has found out that employing a fullerene (among others, a fullerene having an OH group) leads to an enhancement in the dispersibility of the carbon nanotube even though water is employed as a solvent. In particular, it has been brought to light that the fullerene (among others, the fullerene having an OH group) acts upon the metallic carbon nanotube in a priority manner rather than the semiconducting carbon nanotube. That is, the fullerene couples to the metallic carbon nanotube in a priority manner when the fullerene (among others, the fullerene having an OH group) is added under a condition in which the semiconducting carbon nanotube exists together with the metallic carbon nanotube. As a result, it has become clear that the metallic carbon nanotube is dispersed into a solution in a priority manner. And, it has become clear that the semiconducting carbon nanotube can be removed by a solid-liquid separation (for example, the means such as centrifugation) because the semiconducting carbon nanotube is not dispersed into the solution.

Additionally, in the case that semiconducting carbon nanotube and the metallic carbon nanotube exist in a situation of being bundled, only addition of the fullerene hardly leads to the unraveling of this situation of being bundled. Thus, it is preferable to unravel the situation in advance in which the semiconducting carbon nanotube and the metallic carbon nanotube are bundled. It also has become clear that this unraveling can be realized, for example, with sonication (ultrasonic irradiation).

In addition, it also has become clear that employing the fullerene dispersion liquid of the carbon nanotube containing a larger quantity of the metallic carbon nanotube enables the transparent conductive film having high conductivity/transparency to be configured with a simple coating.

The present invention has been accomplished based upon such knowledge.

That is, the foregoing problems are solved by a method of producing the metallic carbon nanotube that is characterized in including a fullerene mixing step of mixing the carbon nanotube in which the metallic carbon nanotube exists together with the semiconducting carbon nanotube, and the fullerene, and a taking-out step of taking out the carbon nanotube dispersed into the solution by the foregoing mixed fullerene.

For example, the foregoing problems are solved by a method of producing the metallic carbon nanotube that is characterized in including a fullerene adding step of adding the fullerene to a carbon nanotube-containing solution in which the metallic carbon nanotube exists together with the semiconducting carbon nanotube, and a taking-out step of taking out the carbon nanotube dispersed by the foregoing added fullerene.

Further, the foregoing problems are solved by a method of producing the metallic carbon nanotube that is characterized in including an unraveling step of unraveling the bundle situation of the carbon nanotube in which the metallic carbon nanotube and the semiconducting carbon nanotube exist in a situation of being bundled, a fullerene mixing step of mixing the carbon nanotube in which the metallic carbon nanotube exists together with the semiconducting carbon nanotube, and the fullerene, and a taking-out step of taking out the carbon nanotube dispersed into the solution by the foregoing mixed fullerene.

For example, the foregoing problems are solved by a method of producing the metallic carbon nanotube that is characterized in including an unraveling step of unraveling the bundle situation of the carbon nanotube in which the metallic carbon nanotube and the semiconducting carbon nanotube exist in a striation of being bundled, a fullerene mixing step of mixing the carbon nanotube in which the metallic carbon nanotube exists together with the semiconducting carbon nanotube, and the fullerene before the foregoing unraveling step, during the foregoing unraveling step, or after the foregoing unraveling step, and a taking-out step of taking out the carbon nanotube dispersed by the foregoing mixed fullerene.

Further, the foregoing problems are solved by the above-mentioned invention, being the method of producing the metallic carbon nanotube, which is characterized in that the carbon nanotube in which the metallic carbon nanotube and the semiconducting carbon nanotube exist in a stiation of being bundled is a single-walled carbon nanotube.

Further, the foregoing problems are solved by the above-mentioned invention, being the method of producing the metallic carbon nanotube, which is characterized in that the foregoing unraveling step is a sonicating step of sonicating the foregoing carbon nanotube existing in a situation of being bundled.

Further, the foregoing problems are solved by the above-mentioned invention, being the method of producing the metallic carbon nanotube, which is characterized in that the foregoing sonicating step has an ultrasonic output of 300 to 800 W, and a sonication time of 10 minutes or more.

Further, the foregoing problems are solved by the above-mentioned invention, being the method of producing the metallic carbon nanotube, which is characterized in that the foregoing fullerene is a fullerene having an OH-group.

Further, the foregoing problems are solved by the above-mentioned invention, being the method of producing the metallic carbon nanotube, which is characterized in that a solvent of the foregoing solution containing the carbon nanotube is any member selected from a group of water, alcohol, and a mixture of water and alcohol.

Further, the foregoing problems are solved by a carbon nanotube dispersion liquid that is characterized in containing a carbon nanotube having a metallic carbon nanotube in a ratio of 50% or more, a fullerene having an OH-group, and a solvent.

Particularly, the foregoing problems are solved by a carbon nanotube dispersion liquid that is characterized in containing a carbon nanotube having a metallic carbon nanotube in a ratio of 50% or more, a fullerene having an OH-group, and a solvent, and in that the foregoing solvent is any member selected from a group of water, alcohol, and a mixture of water and alcohol.

Further, the foregoing problems are solved by a carbon nanotube-containing film that is characterized in containing a carbon nanotube having a metallic carbon nanotube in a ratio of 50% or more, and a fullerene having an OH-group.

Further, the foregoing problems are solved by a transparent conductive film that is characterized in containing a carbon nanotube having a metallic carbon nanotube in a ratio of 50% or more, and a fullerene having an OH-group.

Advantageous Effect of Invention

The present invention, which is the carbon nanotube, mainly employs the so-called metallic carbon nanotube. That is, making the content quantity of the semiconducting carbon nanotube small enhances the conductivity of transparent conductive film that is obtained.

Employing the fullerene enables selective separation of the metallic carbon nanotube. Moreover, the use of fullerene also plays a role of an enhancement in the dispersibility of the metallic carbon nanotube. Thus, it is very favorable.

The metallic carbon nanotube dispersion liquid containing the fullerene is very good in the dispersibility of the carbon nanotube. In particular, the dispersibility of the carbon nanotube is very good even though the concentration of the carbon nanotube is high. In addition, the dispersibility of the carbon nanotube is good even though water (or alcohols) is employed as the solvent. In particular, the dispersibility of the carbon nanotube is very good even though the quantity of the fullerene (dispersing agent) is few.

As a result, the transparent conductive film having high conductivity/transparency can be configured with a simple coating.

And, the above transparent conductive film can be utilized, for example, as a transparent electrode, a touch panel member, and an electromagnetic shield material.

DESCRIPTION OF EMBODIMENTS

The present invention is a method of producing (taking out: separating) the metallic carbon nanotube. The present invention includes a fullerene adding (mixing) step. For example, the present invention includes a fullerene adding (mixing) step of adding (mixing) the fullerene to a solution containing the carbon nanotube in which the metallic carbon nanotube exists together with the semiconducting carbon nanotube. Further, the present invention includes a taking-out step of taking out the metallic carbon nanotube dispersed by the added (mixed) fullerene.

In general, with regard to the carbon nanotube (for example, the single-walled carbon nanotube), the metallic carbon nanotube and the semiconducting carbon nanotube exist in a situation of being bundled. Even though the fullerene is added to a solution containing the carbon nanotube existing in such a situation of being bundled, the metallic carbon nanotube alone cannot be taken out separately only with the addition thereof. Thus, when the metallic carbon nanotube and the semiconducting carbon nanotube exist in a situation of being bundled, the unraveling step of unraveling the foregoing situation of being bundled is necessitated.

The foregoing unraveling step is, for example, a sonicating step of irradiating with the ultrasonic waves. The sonication is, as rule, employed for the dispersion. However, the sonication for unraveling the situation of being bundled demands a stronger intensity than the sonication for the dispersion demands. For example, the sonication for unraveling the situation of being bundled preferably has an output is 10 to 1000 W. It yet preferably has 100 W or more. It more preferably has an output of 300 W to 800 W. Preferably, the sonication time is 10 minutes to 100 minutes. More preferably, it is 20 minutes to 60 minutes. Additionally, when the output is small, the sonication time becomes relatively long. To the contrary, when the output is large, the sonication is finished in a short time.

A bath-type sonicator can be employed for the sonication. Further, a cone-type sonicator can be also employed therefor. Other sonicators may be employed. The cone-type sonicator is preferably employed from a viewpoint that a high output is gained.

When the metallic carbon nanotube and the semiconducting carbon nanotube exist independent of each other (exist separatably) through the above-mentioned unraveling step, the added fullerene acts on (couples to) the metallic carbon nanotube in a priority manner. As a result, the metallic carbon nanotube is dispersed in a priority manner. To the contrary, the semiconducting carbon nanotube on (to) which the fullerene does not act (couple) is low in the dispersibility. And, when the technique of solid-liquid separation is employed, the metallic carbon nanotube can be separated/extracted in a simplified manner because the semiconducting carbon nanotube is low in the dispersibility. The sonication for enhancing the dispersibility is preferably carried out after adding (mixing) the fullerene. It is after the unraveling step, namely, after the bundle situation of the metallic carbon nanotube and the semiconducting carbon nanotube has been unraveled, that the above-mentioned addition (mixing) of the fullerene is performed. However, the fullerene may be added (mixed) in advance at the time of the unraveling operation because there is no possibility that the fullerene is chemically altered by the sonication, apart from the unraveling operation such that the fullerene is influenced.

The taking-out step of taking out the metallic carbon nanotube dispersed by the fullerene is a step of, for example, the centrifugation or the filtration. For example, the step of centrifugating a solution after adding (mixing) the fullerene, and collecting a supernatant is preferably employed. This allows the not-dispersed carbon nanotube to be removed and the conductive film higher in the transparency to be obtained. Additionally, too strong centrifugation causes the dispersed metallic carbon nanotube as well to be removed. To the contrary, when the centrifugation is too weak, the not-dispersed semiconducting carbon nanotube cannot be removed. Thus, the solution is preferably centrifugated in a condition of 10000 G to 100000 G (yet, 30000 G or more. 50000 G or less). The processing time of 1 to 48 hours is preferable. In particular, the processing time of 5 to 24 hours is more preferable. The metallic carbon nanotube dispersion liquid that has been more uniformly dispersed can be obtained as a result of passing through this step. Instead of the above-mentioned centrifugating step, or before the centrifugating step (and/or after the centrifugating step), for example, a filtering step may be adopted. That is, the taking-out (separating: removing) method by the filtration can be also employed. Various filtering methods are employed for the filtration. For example, a suction filtration, a pressure filtration, or a cross-flow filtration can be employed.

The present invention is the carbon nanotube dispersion liquid. This carbon nanotube dispersion liquid contains the carbon nanotube (mainly, the metallic carbon nanotube), the fullerene, and the solvent. In particular, This carbon nanotube dispersion liquid contains the carbon nanotube having the metallic carbon nanotube in a ratio of 50% or more, the fullerene having an OH-group, and the solvent. Additionally, a ratio of the semiconducting carbon nanotube is 50% or less. Preferably, the semiconducting carbon nanotube is not substantially contained. Needless to say, the case that the semiconducting carbon nanotube is not substantially contained (the case that a ratio of the semiconducting carbon nanotube is substantially zero within a range of the inspection error) is more preferable. That is, the semiconducting carbon nanotube has already been removed as much as possible because the carbon nanotube obtained by going through the method of producing (taking out: separating) the metallic carbon nanotube of the present invention is employed. For example, the semiconducting carbon nanotube is not substantially contained. In such a metallic carbon nanotube dispersion liquid, a ratio of the carbon nanotube (the metallic carbon nanotube) versus the fullerene is, particularly, 10 to 1000 mass parts of the fullerene per 100 mass parts of the carbon nanotube (the metallic carbon nanotube). And, a concentration of the fullerene is, particularly, 1 to 100000 ppm (Preferably, it is 10 ppm or more, and yet, 100 ppm or more. It is 10000 ppm or less, and yet, 5000 ppm or less). With the fullerene, the fullerene having a polar group is particularly preferable. Among others, the fullerene having an OH group is preferable. Additionally, basically, the other dispersing agents do not need to be employed because the fullerene exhibits a dispersing effect; however, it does not mean that the dispersing agent should not be employed. Besides, responding to a necessity, an agent for suppressing a decline in the conductivity due to a temperature of the carbon nanotube may be added. For example, polymer having a sulfonic acid group may be added.

The carbon nanotube employed in the present invention, in which the metallic carbon nanotube and the semiconducting carbon nanotube exist in a situation of being bundled, is the single-walled carbon nanotube, for example. Preferably, it is the single-walled carbon nanotube obtained with the arc discharge method. And, more preferably, it is the single-walled carbon nanotube subjected to the wet oxidation process. The details of the wet oxidation process include, for example, a reflux operation of 24 hours or more with nitric acid having a concentration of 50% or more, or a mixed acid of nitric acid and sulfuric acid.

The single-walled carbon nanotube satisfying the following conditions is a preferable one. It has a first absorption in a Raman scattering intensity in a range of which a Raman shift is $1340\pm40$ $cm^{-1}$ in terms of a Raman spectrum that is detected with the 532 nm laser excitation. Yet, it has a second absorption in a Raman scattering intensity in a range of which a Raman shift is $1590\pm20$ $cm^{-1}$. In addition, it satisfies a condition of 0<(the foregoing intensity of the first absorption)/(the foregoing intensity of the second absorption) ≤0.03).

The single-walled carbon nanotube exists in the solution in a situation of being bundled. And, the single-walled carbon nanotube satisfying the condition that the number of the bundles of which a length exceeds 1.5 μm is more than that of the bundles of which a length is 1.5 μm or less is preferable. Or, the single-walled carbon nanotube, which exists in a situation of being bundled, and satisfies the condition that the length of the foregoing bundle is not single but has a predetermined distribution, and the foregoing predetermined distribution has a mode exceeding 1.5 μm in the frequency distribution of the bundle length for each 0.5 μm, is preferable. Among others, the single-walled carbon nanotube satisfying all of the conditions is preferable.

Various liquids are employed for the carbon nanotube dispersion liquid of the present invention as a solvent. However, water, alcohol (particularly, aliphatic alcohol of which a carbon number is 7 or less), or a mixed liquid thereof is preferable as a solvent to be employed. Particularly, the solvent containing at least water is preferable. And, the solvent of which pH exceeds 7 (that is, the solvent indicative of alkaline) is preferable. In a case of measuring the absorbance without dilution, the carbon nanotube dispersion liquid having a maximal of the absorbance with a value of 0.1 or more and 5 or less, which originates in the single-walled carbon nanotube, in a range of 400 nm to 800 nm is preferable.

The film that is obtained by coating a substrate member (in particular, transparent substrate member) with the above-mentioned metallic carbon nanotube dispersion liquid (for example, the coating of a 10 nm to 1000 nm thickness) basically contains the metallic carbon nanotube and the fullerene. As it is, the semiconducting carbon nanotube has already been removed as much as possible because of employment of the carbon nanotube obtained by going through the above-mentioned method of taking out (separating) the metallic carbon nanotube. For example, the semiconducting carbon nanotube is not substantially contained. And, the above dispersion liquid aims for the transparent conductive film, for example. Thus, the obtained coated film is the transparent conductive film, for example.

Hereinafter, explanation will be made more detailedly.

With the fullerenes being employed in the present invention, any fullerene is acceptable. For example, C60, C70, C76, C78, C82, C84, C90, C96, etc. can be listed. Needless to say, a mixture of these plural kinds of the fullerenes may be also employed. Additionally, C60 is particularly preferable from a viewpoint of a dispersion performance. Yet, C60 is easy to obtain. Additionally, not only C60 but also a mixture of C60 and the other kinds of the fullerenes (for example, C70) may be employed. The fullerene having a metal atom appropriately contained inside it is also acceptable. The fullerene having functional groups (polar groups: for example, a hydroxyl group (OH group), a carboxyl group, an epoxy group, an ester group, an amide group, a sulfonyl group, and an ether group) is preferable. Further, the fullerene having phenyl-C61-propyl acid alkyl ester or phenyl-C61-butyric acid alkyl ester may be employed. Further, a hydrogenated fullerene may be employed. However, as mentioned above, the fullerene having an OH-group (hydroxyl group) is particularly preferable. The reason is that the dispersion performance of the metallic carbon nanotube is high. Additionally, the fact that the number of the OH groups is few does not lead to a large enhancement in the dispersibility of the carbon nanotube. When the number of the OH groups is much, the fullerene is hard to synthesize. Thus, it is preferable that the number of the OH groups is 5 to 30 pieces (per one molecule of the fullerene). Particularly, the number of 8 to 15 pieces is preferable.

Herein, it seems that the reason why the fullerene raises the dispersibility of the metallic carbon nanotube is as follows. A benzene ring being contained in the fullerene and the metallic carbon nanotube physically adhere to each other due to a π-π it interaction. And, outwardly, the fullerene acts as a functional group of the metallic carbon nanotube. It is thinkable that this has raised the dispersibility of the metallic carbon nanotube. Additionally, in the foregoing, the reason why the explanation was made, saying "outwardly", is that the fullerene and the metallic carbon nanotube are not chemically coupled to each other, but are physically coupled (they adhere to each other). And, the foregoing π-π interaction is larger as compared with the action by the surfactant conventionally proposed. That is, the fullerene strongly adheres to the metallic carbon nanotube, thereby raising the dispersibility of the metallic carbon nanotube. Additionally, the semiconducting carbon nanotube and the fullerene are not coupled to each other also in a physical manner. It seems that this causes a rise in the dispersibility of the semiconducting carbon nanotube to be suppressed.

By the way, it is understandable that the fullerene having a polar group is preferably employed when the solvent is a solvent having a polar group. The reason is that the fullerene having a polar group is more easily soluble in a polar solvent (for example, water or alcohol) than in a non-polar solvent. Thus, the fullerene having the polar group as described above is preferably employed from a viewpoint of the dispersibility of the metallic carbon nanotube.

When the metallic carbon nanotube dispersion liquid is employed as a paint, water (or/and alcohol) is preferably employed as a solvent from a viewpoint of a reduction in the environmental burden and an improvement in the working environment. When such a solvent is employed, the fullerene having the functional groups (polar groups: for example, a hydroxyl group (OH-group), a carboxyl group, an epoxy group, an ester group, an amide group, a sulfonyl group, an ether group, or the like) is preferably employed from a viewpoint of affinity between the solvent and the fullerene. Particularly, the fullerene having an OH-group (hydroxyl group) is preferable because water or alcohol has an OH-group.

It is preferable that a concentration of the fullerene is 1 ppm to 100000 ppm. Particularly, it is preferable that a concentration of the fullerene is 10 ppm to 10000 ppm. Among others, it is preferable that it is 100 ppm to 5000 ppm. The reason is that when the fullerene concentration is too high, a viscosity becomes too high, which makes the coating difficult. To the contrary, when the fullerene concentration is too low, a large improvement in the dispersibility of the metallic carbon nanotube is not yielded.

The carbon nanotube being employed in the transparent conductive film of the present invention is, in particular, the metallic carbon nanotube. The reason is that the metallic carbon nanotube is high in the conductivity as compared with the semiconducting carbon nanotube and the well-known carbon materials. This metallic carbon nanotube is separated, for example, from the single-walled carbon nanotube. With the single-walled carbon nanotube, for example, the metallic carbon nanotube and the semiconducting carbon nanotube exist in a situation of being bundled. Thus, releasing this situation of being bundled makes it possible to selectively take out the metallic carbon nanotube.

The single-walled carbon nanotube forms a bundle in the solution as well. Herein, the so-called bundle signifies a situation (shape) in which plural pieces of the single-walled carbon nanotubes are overlapped upon each other due to van der Waals force of a side wall. Additionally, the single-walled carbon nanotube prepared with the conventionally known method is obtained in a situation of being bundled. The lengths of this bundle have a certain distribution. However, the single-walled carbon nanotube having the following characteristics is preferable. That is, with the single-walled carbon nanotube, the lengths of the bundle thereof have a certain distribution. For example, the number of the bundles of which the length exceeds 1.5 µm is more than that of the bundles of which the length is 1.5 µm or less. Preferably, the number of the bundles of which the length is 2.0 µm or more is more than that of the bundles of which the length is 1.5 µm or less. Yet preferably, the number of the bundles of which the length is 2.5 µm or more is more than that of the bundles of which the length is 1.5 µm or less. Or, a mode in a frequency distribution (a frequency distribution table or a frequency distribution diagram) of the bundle length for each 0.5 µm exceeds 1.5 µm. Preferably, a mode in a frequency distribution of the length of the bundle exceeds 2.0 µm. Yet preferably, a mode in a frequency distribution of the length of the bundle exceeds 2.5 µm. And, when the bundle had a distribution having the above-mentioned characteristic, the single-walled carbon nanotube was excellent in both of the transparency/conductivity.

The following method is employed for measuring the length of the bundle. The single-walled carbon nanotube is observed with a scanning electron microscope, and its length is measured. Additionally, the method is not limited hereto. No special limitation to the number of the bundles being measured is put. However, so as to obtain accurate statistics, it is preferable to measure 50 bundles or more. Yet, it is more preferable to measure 100 bundles or more. At the moment of measuring the length of the bundle, existence of a lot of impurities makes the measurement difficult. Thus, it is preferable to firstly remove the impurities to an extent in which the length is measurable, and then to measure the length. Further, the length is difficult to measure in a situation in which the bundles are massed. Thus, it is preferable that the bundles are dispersed to an extent in which the bundles can be measured one by one. No special limitation to an aspect of the frequency distribution diagram (table) associated with the length of the bundle is put. For example, any of a symmetrical distribution, an asymmetrical distribution, a J letter-type distribution, a U letter-type distribution, and a bimodal distribution is acceptable. However, the symmetrical distribution is preferable. Additionally, the so-called mode signifies a value of a rank having the highest frequency, out of all ranks. When the rank number is classified, the range is divided for each 0.5 µm, and the number of each division is collected.

As the carbon nanotube (for example, the single-walled carbon nanotube) that is employed for separating/extracting the metallic carbon nanotube, the carbon nanotube subjected to the wet oxidation is preferable. The reason is that the dispersibility into the solvent is improved. No special limitation to the oxidation process is put so long as it is a wet oxidation process. However, inorganic acid (for example, hydrochloric acid, nitric acid, sulfuric acid, phosphoric acid, or a mixed acid thereof) is preferably employed for the wet oxidation. Particularly, nitric acid having a concentration of 50% or more, or a mixed acid of nitric acid and sulfuric acid is preferably employed. With the case of employing a mixed acid of nitric acid and sulfuric acid, when a volume ratio of water, nitric acid, and sulfuric acid over an entirety of a mixed acid solution is defined as a (volume %), b (volume %), and c (volume %), respectively, the mixed acid satisfying $0.20 \leq \{a/(a+b+c)\} \leq 0.40$ and $0.20 \leq \{b/(b+c)\} \leq 0.30$ is more preferable. With regard to the reaction condition of the wet oxidation as well, there is no special limitation hereto. However, so as to perform an effective acid process, it is preferable that the reaction temperature is 85° C. or more. It is preferable that the reaction time is 24 hours or more and yet, it is 48 hours or more. The single-walled carbon nanotube produced with any technique is employed in the present invention. The single-walled carbon nanotube is obtained, for example, with an arc discharge method, a laser ablation method, and a chemical vapor deposition method. However, the single-walled carbon nanotube obtained with the arc discharge method is preferably employed from a viewpoint of crystallization and a yield. The single-walled carbon nanotube of which a purity is high is preferably employed. The reason is that a low purity leads to a decline in a transparency. The purity of the single-walled carbon nanotube can be confirmed with a Raman spectrum measurement. Specifically, with a ratio of an absorption intensity originating in the graphene sheet, being a main component constituting the carbon nanotube, and an absorption intensity originating in a component indicative of a carbon material other than it, the purity of the carbon nanotube can be confirmed. For example, with the case of measuring the single-walled carbon nanotube produced by the arc-discharge with the 532 nm laser excitation, it has a first absorption in a Raman scattering intensity in a range of which a Raman shift is 1340±40 $cm^{-1}$, and has a second absorption in a Raman scattering intensity in a range of which a Raman shift is 1590±20 $cm^{-1}$. Herein, it is said that the first absorption is an absorption originating in an $SP^3$ orbit of the carbon atom, and the second absorption is an absorption originating in the graphene sheet. And, the carbon nanotube of which the second absorption intensity is larger as compared with its first absorption intensity is higher in the purity. The single-walled carbon nanotube in accordance with the present invention satisfying the following condition is preferable. That is, the single-walled carbon nanotube, which has a first absorption in a Raman scattering intensity in a range of which a Raman shift is 1340±40 $cm^{-1}$, and a second absorption in a Raman scattering intensity in a range of which a Raman shift is 1590±20 $cm^{-1}$ in terms of a Raman spectrum that is detected with the 532 nm laser excitation, and satisfies Equation (1) when the foregoing first absorption intensity and the foregoing second absorption intensity are defined as ID and IG, respectively, is preferable. The single-walled carbon nanotube satisfying Equation (2) is particularly preferable. That is, when a value of ID/IG was 0.03 or less, the single-walled carbon nanotube was high in the purity, and was excellent in both of the transparency/conductivity.

$$0 < ID/IG \leq 0.03 \quad \text{Equation (1)}$$

$$0 < ID/IG \leq 0.02 \quad \text{Equation (2)}$$

With the solvent being employed in the present invention, a solvent being employed for the general-use paint is acceptable. No special limit hereto is put. However, the solvent of which a boiling point is 200° C. or less is preferable (the preferable lower limit value is 25° C., and yet, it is 30° C.). The reason why the solvent having a low boiling point is preferable is that drying after coating is made easy. Specifically, alcohol compounds (particularly, alcohol of which a carbon number is 7 or less, and particularly, aliphatic alcohol) such as water, methanol, ethanol, normal-propanol, and iso-propanol, or a mixture thereof are preferable. The solvent indicative of alkaline in which pH exceeds 7 is preferable when water is employed. The reason is that the hydroxyl group-containing fullerene is highly soluble. That is, the metallic carbon nanotube dispersion liquid having a higher concentration can be obtained. Besides, for example, ketone compounds such as acetone, methyl ethyl ketone, methyl isobutyl ketone, and cyclohexanone can be employed. Further, ester compounds such as methyl acetate, ethyl acetate, butyl acetate, ethyl lactate, and methoxyethyl acetate can be employed. Further, ether compounds such as diethyl ether, ethylene glycol dimethyl ether, ethyl cellosolve, butyl cellosolve, phenyl cellosolve, and dioxane can be employed. Further, aromatic compounds such as toluene and xylene can be employed. Further, aliphatic compounds such as pentane and hexane can be employed. Further, halogenic hydrocarbons such as dichloromethane, chlorobenzene, and chloroform can be employed. A mixture of the foregoing compounds can be employed.

A concentration of the metallic carbon nanotube in the metallic carbon nanotube dispersion liquid can be measured quantitatively with a spectrometer. That is, measuring an absorbance by employing the spectrometer makes it possible to quantitatively measure a concentration of the metallic carbon nanotube. In addition, preparing a standard curve to obtain a proportionality constant indicative of an absorbance and a mass ratio makes it possible to indicate the concentration with the mass ratio. Additionally, the above-mentioned proportionality constant differs depending upon the employed metallic carbon nanotube.

The substrate member is coated with the metallic carbon nanotube dispersion liquid obtained as mentioned above, and the transparent conductive film is obtained. And, as described above, the metallic carbon nanotube dispersion liquid in accordance with the present invention is high in the dispersibility of the metallic carbon nanotube. For example, it is dispersed in the solvents such as water and alcohol at a high dispersibility. Thus, various coating methods such as a spray coating, a bar coating, a roll coating, an inkjet, a screen coating can be employed.

No special limit to the substrate member being coated with the metallic carbon nanotube dispersion liquid is put. The transparent substrate member (film, sheet, plate of which a thickness is higher than the foregoing film (sheet)) is preferable in a field in which the transparency is required, for example, a transparent electrode being employed for a display etc. For example, acrylic resin, polyester resin, polycarbonate resin, polystyrene resin, styrene-acrylic acid copolymer, vinyl chloride resin, polyolefin, ABS (acrylonitrile-butadiene-styrene copolymer), vinyl alcohol resin, cycloolefin resin, cellulose resin, etc. can be employed. Besides, inorganic glass etc. can be employed. However, the substrate member made of organic resin that is excellent in flexibility is preferable. A hard coat layer, an anti-contamination layer, an anti-glare layer, an anti-reflection layer, an adhesive layer, a colored layer etc. are formed (laminated) on the surface of the foregoing substrate member (the surface of the side in which the conductive layer is formed, and/or on the backside opposite to the side in which the conductive layer is formed) responding to a necessity. The thickness of the substrate member is governed by the purpose thereof However, as a rule, it is 10 μm to 10 mm or so.

After the above-mentioned coating step, so as to remove the solvent being contained in the coated film, a drying operation is performed. A heating oven is employed for the drying operation. Further, a far infrared oven may be employed. Further, an ultra-far infrared oven may be employed. Besides these ovens, the apparatuses, which can be usually used for drying, can be employed.

In the above-mentioned manner, the transparent conductive film excellent in the conductivity and the transparency can be obtained. And, the transparent conductive film excellent in the conductivity and the transparency can be utilized for an electrode substrate for a touch panel. Further, it can be utilized for an electrode substrate for electronic paper. Further, it can be utilized for an electrode substrate for a liquid crystal display. Further, it can be utilized for an electrode substrate for plasma display. Besides, it can be utilized for various applications.

Hereinafter, the present invention will be explained by listing specific examples. Additionally, needless to say, the present invention is not limited to the following examples.

EXAMPLE 1

The single-walled carbon nanotube was prepared with the arc-discharge method. This prepared single-walled carbon nanotube was subjected to the wet oxidation process (for example, with nitric acid having a concentration of 63% at 85° C. for 2 days). Thereafter, the single-walled carbon nanotube was purified/collected with the filtering.

The length of the bundles of this purified single-walled carbon nanotube was investigated. As a result, it became clear that a mode existed in the range of 1.5 μm to 2.0 μm. And, a ratio of the number of the bundles of the single-walled carbon nanotube of which the length of the bundle exceeded 1.5 μm over an entirety was approximately 73%. A ratio of the number of the bundles of the single-walled carbon nanotube of which the length of the bundle was 1.5 μm or less over an entirety was approximately 27%. Additionally, a ratio of the number of the bundles having a length of 1.0 μm to 1.5 μm was approximately 13%, a ratio of the number of the bundles having a length of 1.5 μm to 2.0 μm was approximately 20%, a ratio of the number of the bundles having a length of 2.0 μm to 2.5 μm was approximately 18%, and a ratio of the number of the bundles having a length of 2.5 μm to 3.0 μm was approximately 13%. That is, the number of the bundles of the single-walled carbon nanotube of which the length of the bundle was 1.5 μm or less was smaller than that of the bundles of the single-walled carbon nanotube of which the length of the bundle exceeded 1.5 μm.

20 mg of the single-walled carbon nanotube obtained in the above-mentioned manner, 3 mg of the hydroxyl group-containing fullerene (a product name: Nanom Spectra D-100 produced by Frontier Carbon Corporation; the fullerene was consisted of only C60), 0.3 mg of sodium hydroxide (produced by Wako Pure Chemical Industries, Ltd.), 5 ml of water, and 5 ml of isopropanol were mixed. The concentration of the single-walled carbon nanotube was 2230 ppm.

The above-mentioned mixed liquid was sonicated for 20 minutes by employing the cone-type sonicator (output 650 W and frequency 40 Hz). This allowed the single-walled carbon nanotube being in a situation of being bundled to be unravelled. That is, the single-walled carbon monotube was dissociated into the metallic carbon nanotube and the semiconducting carbon nanotube.

The hydroxyl group-containing fullerene coupled to the above-mentioned metallic carbon nanotube, and hence, the metallic carbon nanotube was sufficiently dispersed into a water/alcohol solution. On the other hand, the semiconducting carbon nanotube was poorly dispersed into the water/alcohol solution.

Thereafter, the carbon nanotube dispersion liquid was subjected to a centrifugation operation by employing a centrifuge (a product name: CR26H manufactured by Hitachi Koki Co., Ltd.) The condition of the centrifugation is 20000 rpm (48000G) for 7 hours. And, the centrifugated supernatant was collected. And, this supernatant and the solution prior to the ultrasonic wave process were investigated with the spectrometer. As a result, it was confirmed that the supernatant absorbed a metallic component (650 nm) much more than a semiconducting component (1010 nm) as compared with the supernatant not subjected to the separation.

The bar coating was carried out for polycarbonate substrate having the hard coat with the above supernatant subjected to the centrifugation operation, namely, the metallic carbon nanotube dispersion liquid (after removing the semiconducting carbon nanotube). A coating thickness (wet thickness) is 50 μm. And, after the coating, it was dried at 80° C. for 3 minutes. And, the polycarbonate substrate with the transparent conductive film was obtained. The conductivity of this polycarbonate substrate with the transparent conductive film was investigated. As a result, the conductivity was 149Ω/□, and its practicability was sufficient. Further, the transparency was 74%, and its practicability was sufficient. From the above result, the present invention made it possible to obtain the dispersion liquid with a high concentration, which the prior art (the concentration of the carbon nanotube disclosed in the patent literature 1 was 112 ppm) was not able to accomplish, and realize the operation of separating the metal/semiconductor at a high concentration.

EXAMPLE 2

The commercially available metallic carbon nanotube (IsoNanotubes-M: Metallic SWNTs produced by NanoIntegris Inc.) was subjected to the centrifugation operation, and a taken-out solid, the hydroxyl group-containing fullerene, sodium hydroxide, water, and isopropanol were mixed/dispersed. Thereafter, they were subjected to the centrifugation operation. And, the bar coating was carried out for polycarbonate substrate having the hard coat with the supernatant. It was dried. And, with this, the polycarbonate substrate with the transparent conductive film was obtained.

Additionally, in this example, the metallic carbon nanotube and the semiconducting carbon nanotube are not in a situation of being bundled. Thus, the ultrasonic wave process for unraveling the bundle performed in the example 1 was not performed.

The conductivity of the above-mentioned polycarbonate substrate with the transparent conductive film was investigated. As a result, the conductivity was 1350Ω/□, and its practicability was sufficient. Further, the transparency was 78.68%, and its practicability was sufficient.

COMPARATIVE EXAMPLE 1

The commercially available semiconducting carbon nanotube (IsoNanotubes-S: Semiconducting SWNTs produced by NanoIntegris Inc.) was subjected to the centrifugation operation, and a taken-out solid, the hydroxyl group-containing fullerene, sodium hydroxide, water, and isopropanol were mixed/dispersed. Thereafter, they were subjected to the centrifugation operation. And, the bar coating was carried out for polycarbonate substrate having the hard coat with the supernatant. It was dried. And, with this, the polycarbonate substrate with the transparent conductive film was obtained.

The conductivity of the conductive film of this polycarbonate substrate with the conductive film was investigated. As a result, there was no conductivity having practicability. Additionally, it was thinkable that the reason why the conductive film of this comparative example had no practical conductivity was that the metallic carbon nanotube was not employed, namely, only the semiconducting carbon nanotube was employed. Further, the semiconducting carbon nanotube is poor in the dispersibility even though the hydroxyl group-containing fullerene is employed. As a result, it was thinkable that the reason is that the quantity of the semiconducting carbon nanotube contained in the supernatant subjected to the centrifugation operation was small.

This application is based upon and claims the benefit of priority from Japanese patent application No. 2008-274688, filed on Oct. 24, 2008, the disclosure of which is incorporated herein in its entirety by reference.

The invention claimed is:

1. A method of producing a metallic carbon nanotube, comprising:
   mixing carbon nanotubes, which comprise the metallic carbon nanotube and a semiconducting carbon nanotube in a bundled arrangement, and a fullerene in a solution;
   unraveling the carbon nanotubes;
   taking out the metallic carbon nanotube, which has been dispersed into the solution by the fullerene; and
   removing the semiconducting carbon nanotube by a solid-liquid separation method,
   wherein the fullerene comprises a functional group selected from the group consisting of an OH-group, a carboxyl group, an epoxy group, an ester group, an amide group, a sulfonyl group, and an ether group, and
   the mixing is carried out before, during, or after the unraveling.

2. The method of claim 1, wherein the carbon nanotubes comprise a single-walled carbon nanotube.

3. The method of claim 1, wherein the unraveling comprises sonicating the carbon nanotubes.

4. The method of claim 3, wherein the sonicating has
   an ultrasonic output of 300 to 800 W, and
   a sonication time of 10 minutes or more.

5. The method of claim 1, wherein the fullerene comprises an OH-group.

6. The method of claim 1, wherein a solvent of the solution is at least one member selected from the group consisting of water and an alcohol.

7. The method of claim 2, wherein the fullerene comprises an OH-group.

8. The method of claim 3, wherein the fullerene comprises an OH-group.

9. The method of claim 4, wherein the fullerene comprises an OH-group.

10. The method of claim 2, wherein a solvent of the solution is at least one member selected from the group consisting of water and an alcohol.

11. The method of claim 1, wherein the semiconducting carbon nanotube is not dispersed into the solution.

12. The method of claim 1, wherein the solid-liquid separation method is centrifugation.

13. The method of claim 5, wherein a number of the OH-group is from 5 to 30 per molecule of the fullerene.

14. The method of claim 5, wherein a number of the OH-group is from 8 to 15 per molecule of the fullerene.

* * * * *